Sept. 24, 1929.   A. PRABELL   1,729,011
SPACER FOR MULTIPLE BAKING PANS
Filed Oct. 27, 1928
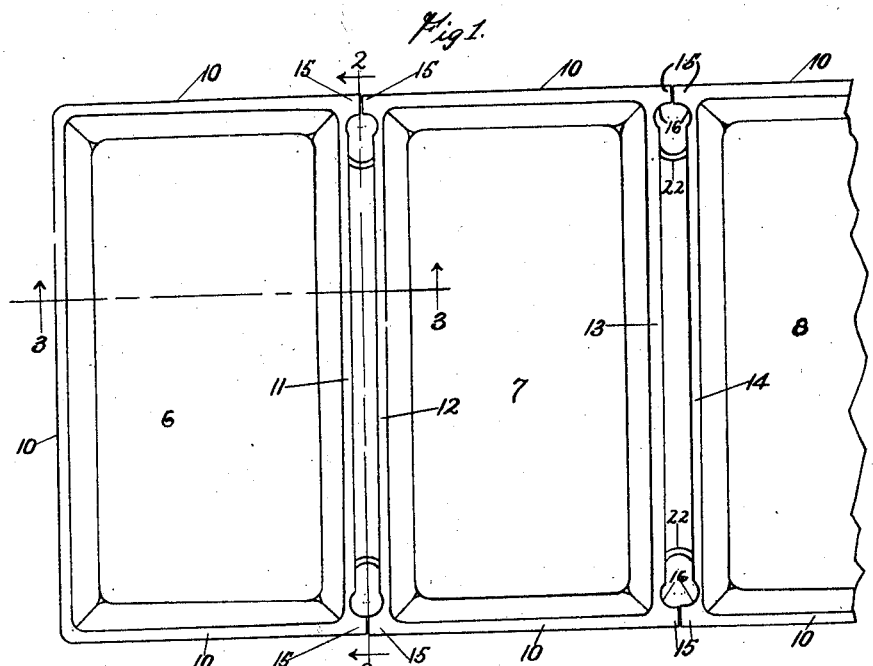
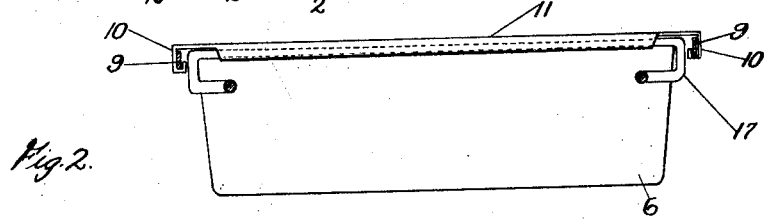
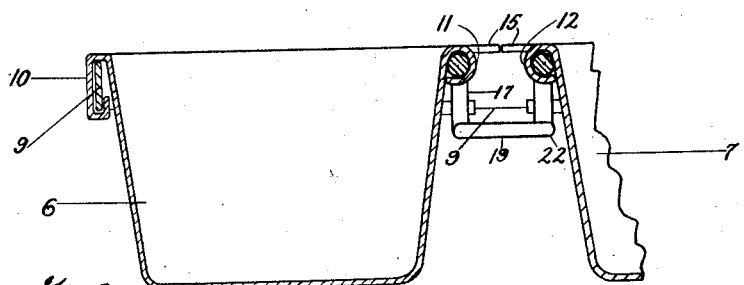
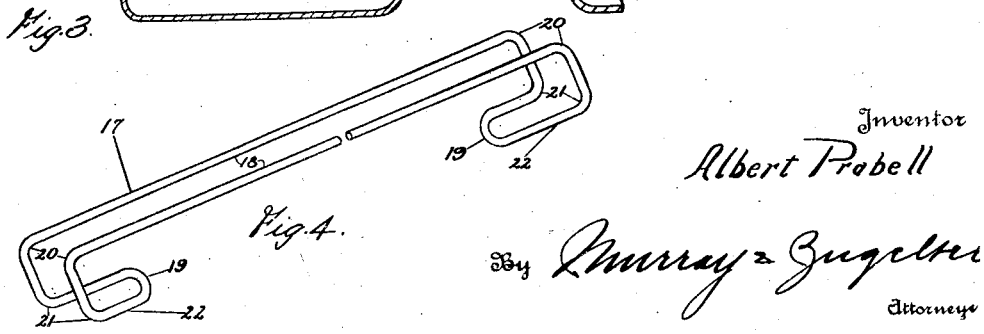
Inventor
Albert Prabell
By Murray & Zugelter
Attorneys Patented Sept. 24, 1929

1,729,011

UNITED STATES PATENT OFFICE

ALBERT PRABELL, OF BELLEVUE, KENTUCKY, ASSIGNOR TO THE LOCKWOOD MANUFACTURING COMPANY, OF CINCINNATI, OHIO, A CORPORATION OF OHIO

SPACER FOR MULTIPLE BAKING PANS

Application filed October 27, 1928. Serial No. 315,415.

This invention relates to a spacing means for use with sets of baking pans of the type used in quantity production of bread and similar articles of baked goods.

An object of the invention is to provide a means for preventing deep nesting of the pans when the sets are positioned or nested one within the other.

Another object is to provide for free circulation of air between the pans without interfering with the convenient nesting of the pans.

Another object is to reduce to a minimum the points of contact between the sets of pans when they are nested, thus decreasing the denting and bending of the parts that ordinarily result.

Another object is to absorb the shocks that occur when one set is nested within another.

These objects are attained by means described herein and set forth in the accompanying drawings, in which:

Fig. 1 is a plan view of a set of pans embodying the device of the present invention, parts being broken away.

Fig. 2 is a view on line 2—2 of Fig. 1.

Fig. 3 is an enlarged view of line 3—3 of Fig. 1.

Fig. 4 is a view of the device of the present invention before its attachment to the baking unit.

The customary method of forming a number of pans into a set or baking unit is to bind them together by a metal strip extending around the ends and the two outermost sides of the pans after the latter are placed side by side. Ordinarily, when one unit is nested within another, the metal strip binding the upper unit contacts the top edges of the unit beneath whereby the upper unit is supported. The metal strip is usually positioned adjacent the top edges of the pans which it binds together and hence, to prevent deep nesting of the pans, it has been necessary to provide a wide binding strip. Such a strip obstructs the free circulation of cold and hot air between the pans and hinders both the cooling and the baking process. The disadvantage of utilizing the strip to space the baking units when nested, is that the top edges of the pans, due to repeated shocks resultant upon nesting of the units, become dented and misshapen. Moreover, these top edges are frequently turned down upon the binding strip for securing the latter to the pans, and under these circumstances, the constant knocking and bending of these overlapping edges permits loosening of the binding strip and eventually destroys the usefulness of the pans as a unit.

The present invention overcomes these disadvantages by providing a wire spacing device in the form of an elongated loop with parallel sides, the looped end portions being turned under to provide feet. These spacers are positioned between the different pans in a baking unit with the parallel sides of the spacers held by the top side edges of the pans and the feet of the spacers extending down into the spaces between the pans. The spacers, therefore, assist in separating one pan from another in a given unit, and likewise separate one unit from another into which it is nested, since the feet of the wire spacer extend down and rest upon the upper side edges of the pans beneath, thus preventing direct contact and deep nesting of the two units.

This wire spacer obviates the wide binding strip formerly used to prevent deep nesting, and thus free circulation of air between the pans is permitted. The spacer likewise saves the top edges of the pans from the bending and misshaping that occurs when the binding strip is used to space the units in nesting.

In the drawings, the pans 6, 7 and 8 are bound together by a narrow metal strip 9 which is secured to the pans by bending the outer edges 10 of the latter, downwardly and inwardly to enclose the strip therein, as shown in Figs. 2 and 3. The adjacent rolled edges 11 and 12, and 13 and 14, of the baking unit, are prevented from contacting one another partly by the ears 15 which are integral extensions of the corners of the pans, and partly, by the spacers, as will be described. The cuts 16 adjacent ears 15 permit edges 11, 12, 13 and 14 to be rolled under without obstruction or binding.

The spacing device 17, of the present invention, is formed of a piece of heavy wire bent upon itself so as to provide the parallel arms 18 and end loops 19. Arms 18, adjacent their ends, are further bent at two points, as at 20 and 21, at angles of approximately 90 degrees, to provide the feet 22. In its completed form, the length of the spacer 17 is somewhat less than the length of the pans, and the distance between arms 18 is slightly greater than the distance between the edges 11 and 12 and the edges 13 and 14.

One of the spacers 17 is positioned between each pair of pans in the unit. Spacer 17 is secured thus: the edge 11, between the cuts 16 adjacent its ends, is rolled outwardly relative to the pan 6, and turned inwardly to enclose one of the arms 18. Edge 12 of the adjacent pan 6 is similarly rolled to enclose the other arm of the same spacer 17. The feet 22 extend downwardly into the space between pans 6 and 7. All this is illustrated in Figs. 2 and 3. Similar procedure is followed in positioning one of the spacers 17 between pans 7 and 8, and the remainder of the pans that might be included in a given baking unit. A baking unit having thus been provided with spacers of the present invention, it is evident that when such unit is nested within another unit, the feet 22 of the spacers 17 will contact the uppermost surfaces of edges 11, 12, 13, and 14, of the unit beneath, and thus support the one unit within the other. These same edges are likewise greatly strengthened by the arms 18 which they enclose.

The spacers of this invention make possible the use of a narrow binding strip so that there is practically no obstruction in the passage of air between the pans. The flattening and misshaping of the edges 10 usually experienced when the binding strip is used as a spacer, is entirely eliminated since the spacers 17 hold the edges 10 of nested units altogether out of contact. There is little or no wear upon the edges 11, 12, 13 and 14, since the feet 22 contact only a negligible portion thereof. The spacers 17, being of wire, and therefore resilient, absorb to a great extent, the shocks that occur when one unit is droppd or nested into another, and thus prolong the serviceable life of the baking units.

What is claimed is:

1. The combination of multiple baking pans and a series of spacing devices, each comprising a wire loop adapted to be secured to both of two adjacent pans for reenforcing the edges thereof, and bent to form spaced, resilient feet adapted to prevent deep nesting of the pans.

2. A baking unit comprising a plurality of baking pans with parallel sides, the pans being bound together in spaced parallelism, and a wire spacing device comprising parallel arms, one of the arms being secured to a side of one of the pans and another of the arms being secured to the adjacent side of the adjacent pan, said spacing device providing spaced, resilient feet extending downwardly into the spaces between the pans and serving to prevent deep nesting of the pans when one unit is lowered into another.

3. A spacing device for baking units and comprising a piece of heavy wire shaped to provide two parallel arms connected at the ends thereof, the arms adjacent said ends being bent to provide feet extending in the same direction from the parallel arms and in spaced parallelism therewith, said spacing device being adapted to be secured between the pans of a baking unit to prevent deep nesting of one unit into another.

4. In a baking unit comprising a plurality of pans bound together in parallel relation, means for spacing one unit from another when nested, said means comprising a wire shaped to provide parallel arms connected at the ends thereof, the arms adjacent said ends being bent to provide feet in spaced parallelism with the parallel arms, the adjacent side edges of adjacent pans being rolled outwardly to enclose the arms of the wire spacing means, one arm being secured by an edge of one pan and another arm being secured by the adjacent edge of the adjacent pan, said feet extending downwardly into the spaces between the pans such that in nesting the one unit into another, the feet contact the upper edges of the pans beneath.

5. A baking unit comprising a plurality of pans with parallel sides, said pans being secured together in parallel relation, the upper corners of each pan having ears extending in the direction of the adjacent pan to effect spacing of the pans, and means positioned in the spaces thus provided, said means being secured to both of two adjacent pans and providing resilient feet extending downwardly between the pans to spacedly support the baking unit upon another like unit into which said first unit is nested.

6. A baking unit comprising a plurality of pans with parallel sides, the pans being secured together in parallel relation, the upper corners of each pan having ears extending in the direction of the adjacent pan and contacting similar ears on the adjacent pan to effect lateral spacing of the pans, and means for spacing this unit from another unit into which it is nested, said means comprising a resilient wire shaped to provide parallel arms with feet extending transversely thereof in spaced parallelism therewith, the wire device being positioned in the spaces between the pans, the feet thereof extending downwardly into the spaces, the adjacent lateral edges of adjacent pans being rolled, one each, about an arm of said spacing means to operatively secure the latter.

In testimony whereof, I have hereunto subscribed my name this 23rd day of October, 1928.

ALBERT PRABELL.